US012686988B2

(12) United States Patent
Cathey et al.

(10) Patent No.: US 12,686,988 B2
(45) Date of Patent: Jul. 21, 2026

(54) FRAME AND COVER FOR INGROUND UTILITY ENCLOSURES

(71) Applicant: Omega Metalworks LLC, Colorado Springs, CO (US)

(72) Inventors: John Mason Cathey, Colorado Springs, CO (US); Joseph Charles Niemi, Colorado Springs, CO (US)

(73) Assignee: OMEGA METALWORKS LLC, Colorado Springs, CO (US)

( * ) Notice: Subject to any disclaimer, the term of this patent is extended or adjusted under 35 U.S.C. 154(b) by 175 days.

(21) Appl. No.: 18/415,528

(22) Filed: Jan. 17, 2024

(65) Prior Publication Data

US 2024/0240424 A1 Jul. 18, 2024

Related U.S. Application Data

(60) Provisional application No. 63/439,448, filed on Jan. 17, 2023.

(51) Int. Cl.
*E02D 29/14* (2006.01)
*E05F 1/10* (2006.01)

(52) U.S. Cl.
CPC ..... *E02D 29/1418* (2013.01); *E02D 29/1463* (2013.01); *E05F 1/1008* (2013.01); *E02D 29/1427* (2013.01); *E02D 29/1454* (2013.01)

(58) Field of Classification Search
CPC ............ E02D 29/1418; E02D 29/1463; E02D 29/1427; E02D 29/1454; E02D 29/14; E05F 1/1008; E05F 1/1215; E05Y 2999/00
See application file for complete search history.

(56) References Cited

U.S. PATENT DOCUMENTS 2,626,421 A * 1/1953 Lyons .................. E05F 1/1215 16/306
4,534,132 A * 8/1985 Smith .................. E05F 1/1215 49/386
4,840,171 A * 6/1989 Rohling ................ B64D 11/00 128/206.27
5,079,799 A * 1/1992 Rude .................... E05D 11/084 16/322
5,467,504 A * 11/1995 Yang .................... E05D 11/084 16/342

(Continued)

FOREIGN PATENT DOCUMENTS

FR 2680811 A1 * 3/1993 ......... E05B 63/0069

*Primary Examiner* — Omar F Hijaz
(74) *Attorney, Agent, or Firm* — Procopio, Cory, Hargreaves & Savitch LLP

(57) ABSTRACT

Described are hatch assemblies comprising a frame having sidewalls, a pivotally connected cover, and a number of easily repairable and replaceable torsion-spring-assisted hinge assemblies. Hinge assemblies may comprise a torsion spring having a coiled body along the center axis of which a carriage bolt is inserted. Once one end of the torsion spring that extends vertically from the center axis is engaged by a support member, such as a semi-open enclosure that is mounted on a hinge plate, the spring is rotated and supports the torque generated by the weight of the cover when operated by a user. Advantageously, this provides for a controlled and almost effortless opening and closing of a heavy door or covers of hatch assemblies.

12 Claims, 9 Drawing Sheets

(56) References Cited

U.S. PATENT DOCUMENTS

| | | | | | |
|---|---|---|---|---|---|
| 5,937,583 | A * | 8/1999 | Lamperti | E02D 29/1418 | 49/386 |
| 7,216,459 | B1 * | 5/2007 | Akkala | E05F 1/1016 | 49/386 |
| 8,578,559 | B2 * | 11/2013 | Lin | G06F 1/1681 | 16/306 |
| 2011/0215606 | A1 * | 9/2011 | Trivedi | B60N 3/00 | 16/278 |
| 2017/0298982 | A1 * | 10/2017 | Chu | F16M 11/10 | |

* cited by examiner

FRAME AND COVER FOR INGROUND UTILITY ENCLOSURES

RELATED APPLICATIONS

The present application claims priority benefit, under 35 U.S.C. § 119(e), to U.S. Provisional Patent Application No. 63/439,448, filed on Jan. 17, 2023, entitled "LID AND FRAME FOR AN INGROUND UTILITY ENCLOSURE," which application is herein incorporated by reference in its entirety.

FIELD

The present disclosure generally relates to the field of opening and closing mechanisms for doors, lids, and similar enclosure coverings. More particularly, the disclosure relates to spring-assisted lift mechanisms for hatches, such as inground utility vault frames and lids.

BACKGROUND OF THE INVENTION

In some applications, relatively large and, thus, heavy covers or doors, such as hinged lids, must be opened to allow access to an enclosure, for example, to move or service industrial equipment. Such doors can weigh several tens of pounds or more, requiring considerable effort to open them. In addition, the construction of lifting heavy doors requires additional support mechanisms, for example, to prevent a door from dropping with great force when suddenly released, potentially resulting in an injury to the operator. Conventional approaches often involve using smaller-sized lids or lightweight materials, such as aluminum, to reduce the weight of the lid, which typically must be supported until the center of the mass of the lid is raised above the hinge line. However, such methods may not always be feasible or desirable, especially in applications requiring high material strength, like lids for hatches for inground utility enclosures. Other approaches, such as pneumatic lifts for doors that require less operating force, lead to increased installation, maintenance, and repair costs.

Accordingly, what is needed are solutions that address the shortcomings of prior approaches.

SUMMARY OF THE INVENTION

Hatch assemblies according to various embodiments herein may comprise a frame with sidewalls having three sidewalls having and L-shaped cross-section and one sidewall having a C-shaped cross-section, each sidewall comprising a bottom portion whose combination portions define an opening in the frame; support structure constructed from a grid of flatbars to support a cover assembly; and torsion-spring-assisted hinge assemblies that pivotally connect the cover assembly to the frame. Such hatch assemblies facilitate controlled opening and closing of a heavy cover assembly, thus reducing the physical effort required by the user, and may further be equipped with a stop mechanism to limit the cover's range of motion.

The cover of the hatch assembly may be implemented as a planar cover having an anti-slip exterior surface and a bottom surface that features vertically downward extending flatbars. For security and case of operation, that cover may be equipped with a latch or safety lock to maintain a closed position when not in use and, for easy operation, a handle that remains flush against the cover when not in use. Additionally, the cover may have a first cutout to accommodate fasteners for securing the cover assembly to the frame. The frame may comprise support members that aid in embedding the frame into a concrete or asphalt surrounding. Suitable support members may comprise anchor bars or studs that extend outwardly from the frame's periphery.

The hinge assembly may comprise a torsion spring with a coiled body, first and second ends, and a carriage bolt inserted along the spring's center axis. The first end of the torsion spring may extend vertically from the center axis and be designed to withstand the torque generated by the cover assembly's weight during closure. The hinge assembly may further comprise a hinge plate that has a first bore for connecting multiple hinge assemblies and aligning with a second bore of a support member. The hinge plate may comprise a vertically extending plate, or a semi-open enclosure partially enclosing the first end of the torsion spring, that when engaged by the hinge plate, causes the first end of the spring to rotate. The hinge assembly may further comprise a third bore for receiving the first end of the carriage bolt, around which the hinge plate pivots during operation.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not necessarily to scale.

DETAILED DESCRIPTION OF THE INVENTION

The use of certain terms in various places in the specification is for illustration and should not be construed as limiting. The terms “include,” “including,” “comprise,” “comprising,” and any of their variants shall be understood to be open terms, and any examples or lists of items are provided by way of illustration and shall not be used to limit the scope of this disclosure. In this document, the terms inground and underground are used interchangeably. Similarly, the terms “lid” and “cover” are used interchangeably and may refer to lid or cover assemblies.

Figure 1:
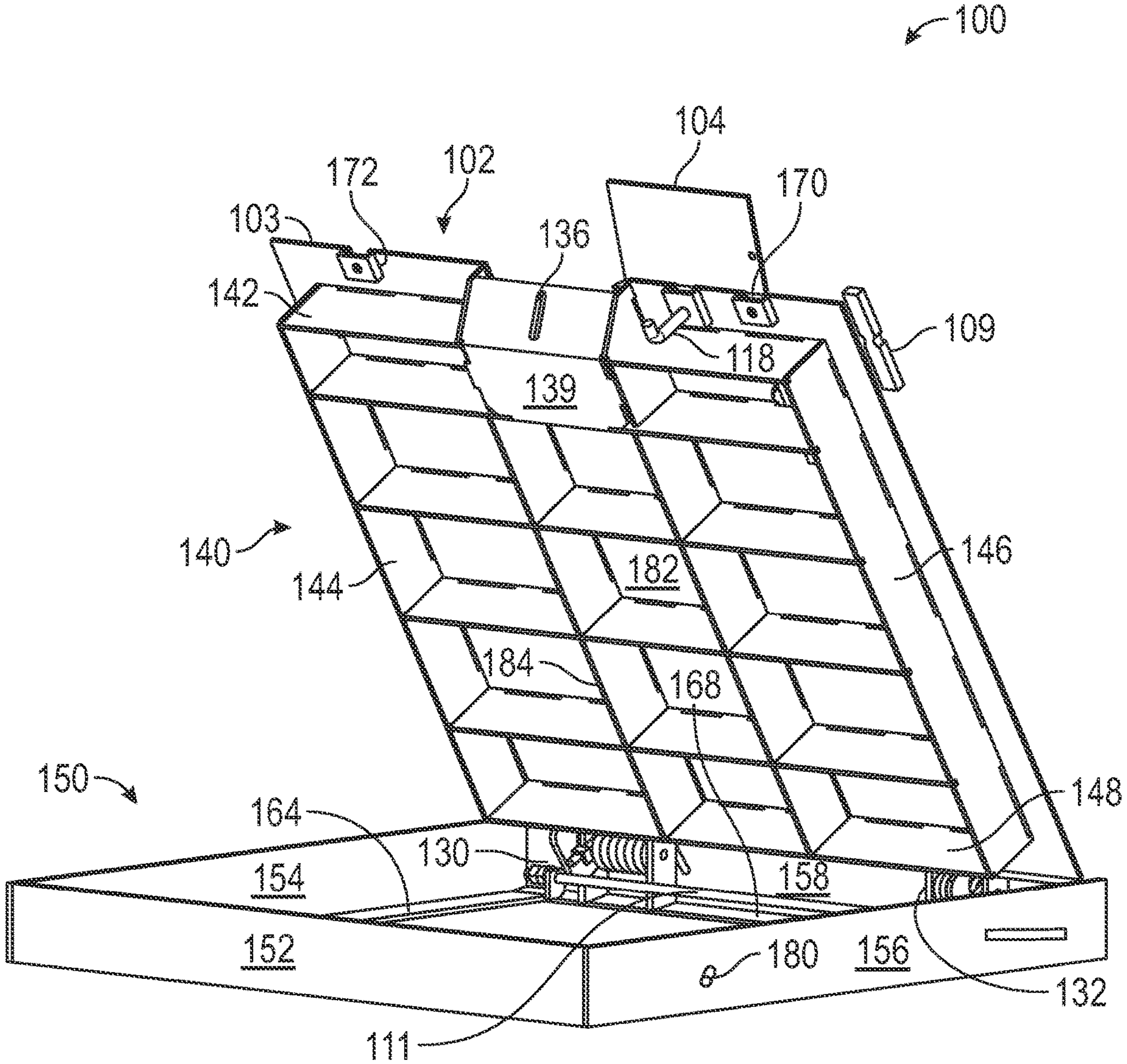
FIG. 1 is a perspective view of a hatch assembly with a partially opened hinged cover assembly, according to various embodiments of the disclosure.

FIG. 1 is a perspective view of a hatch assembly 100 with a partially opened cover assembly 102, according to various embodiments of the disclosure. Hatch assembly 100 may be used for example as an access point to an underground maintenance vault for utilities such as electrical or communications systems. It is understood that hatch assembly 100 may serve as a replacement for existing hatch assemblies of similar size.

Hatch assembly 100 may comprise cover assembly 102; first and second hinge assemblies 130, 132 connected by rod 111; support structure 140; and frame 150. Each component will be discussed in greater detail below with reference to FIG. 3 through FIG. 7, respectively.

As depicted, cover assembly 102 in FIG. 1 may comprise cover 103, recessable handle 109, latch 118, lock box 139, and have cutouts 170 to which recessed areas 172, 173 may be welded. Support structure 140 comprises first sidewall 142, second sidewall 144, third sidewall 146, and fourth sidewall 148. A series of compartments 182 are formed by flatbars 184 within support structure 140.

Frame 150 is constructed from three L-shaped flatbars, each having L-shaped cross sections, that form first sidewall 152, second sidewall 154, and third sidewall 156. A fourth sidewall 158 comprises a C-shaped (or U-shaped) cross-section, e.g., made from C-channel material. Each of the sidewalls comprises a respective bottom portion (e.g., 164 corresponding to second sidewall 154). The combination of which defines opening 160 for ingress and egress. As depicted, third sidewall 156 comprises an outward-facing surface that may comprise any number of anchors 180 that extend outwardly from the periphery of frame 150. Exemplary anchors can be short pieces of rebar welded to one or more flatbars of frame 150. Anchors may be utilized, e.g., to anchor frame 150 once it is embedded into a concrete surrounding (not shown in FIG. 1).

Figure 2A:
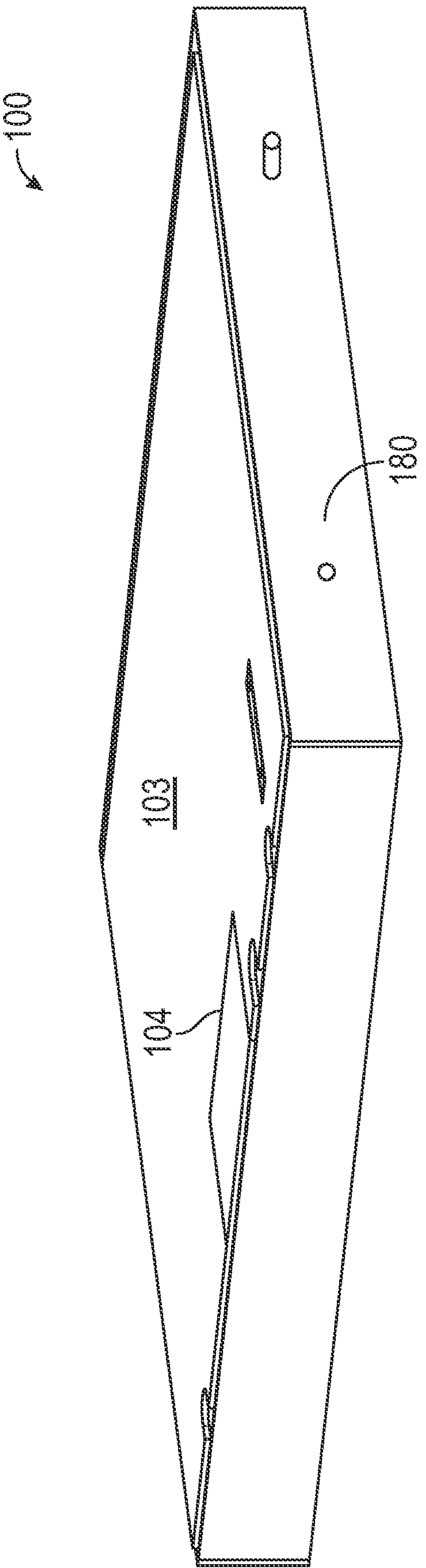
FIG. 2A depicts the hatch assembly of FIG. 1 with the cover closed.
Figure 2B:
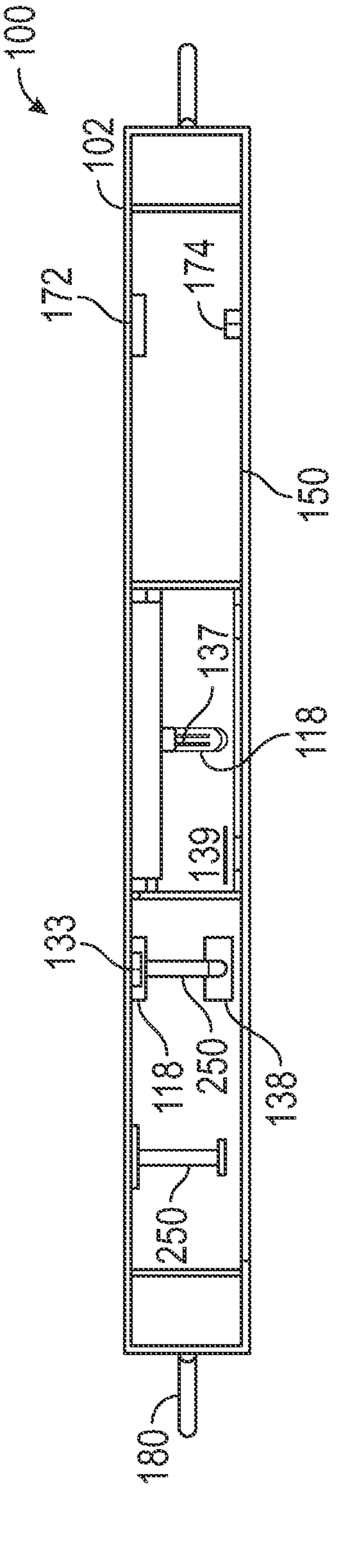
FIG. 2B is a cross-section of the hatch assembly of FIG. 1.

FIG. 2A depicts the hatch assembly of FIG. 1 with the cover assembly 102 closed. FIG. 2B depicts a cross-section of the hatch assembly comprising Nelson stud 250; latch 118, located in slot 138; hook 137, located in lock box 139; recessed area 172; hex nut 174; and anchor 180. In operation, latch 118 keeps cover assembly 102 closed when hatch assembly 100 is not used for providing access. As depicted, latch 118 comprises toggle bolt 133 that, in response to being rotated, engages with slot 138 to hold down cover assembly 102 when cover 103 assumes its closed position. Advantageously, this prevents cover 103, once under tension, from accidentally or unwantedly opening.

In addition, hook 137 (shown more clearly in FIG. 7) is welded to frame 150 and passes through slotted hole 138 in the angled wall of lock box 139 when cover 103 is closed. The top portion of hook 137 forms a loop (or opening) that is dimensioned to be sufficiently large to allow a lock to pass through, e.g., to allow a utility company to use a lock to lock hatch assembly 100 such as to prevent unauthorized access to a vault.

Figure 3:
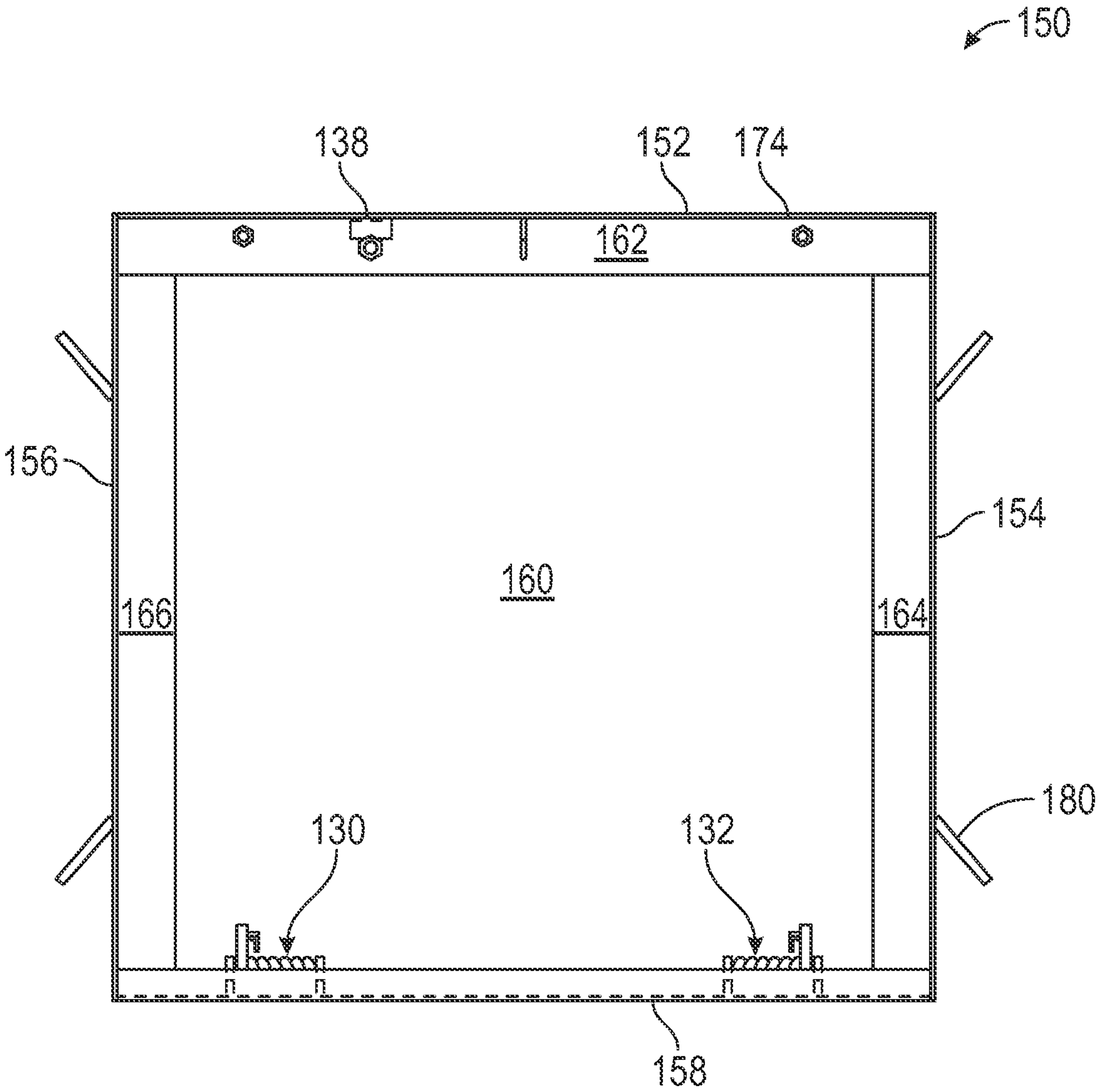
FIG. 3 depicts a top plan view of an embodiment of a frame assembly for receiving a cover assembly according to various embodiments of the disclosure.

FIG. 3 depicts a top plan view of an embodiment of the frame assembly 150 for receiving a cover assembly 102 according to various embodiments of the disclosure. It is understood that although first sidewall 152, second sidewall 154, third sidewall 156, and fourth sidewall 158 of frame 150 form a square shape in FIG. 3, this is not intended as a limitation on the scope of the disclosure. As one of skill in the art will appreciate, frame 150 and a corresponding receiving cover (not shown in FIG. 3) may be implemented as rectangular or even circular constructs. Further, any anchor bar or stud 180 known in the art may be placed along the periphery of frame 150 to perform anchoring. Exemplary anchors 180 may be positioned at a 45-degree angle relative to frame 150. An exemplary opening 160 for frame 150 may be dimensioned three feet by three feet or greater. Hinge assemblies 130, 132, can be four inches long.

Figure 4:
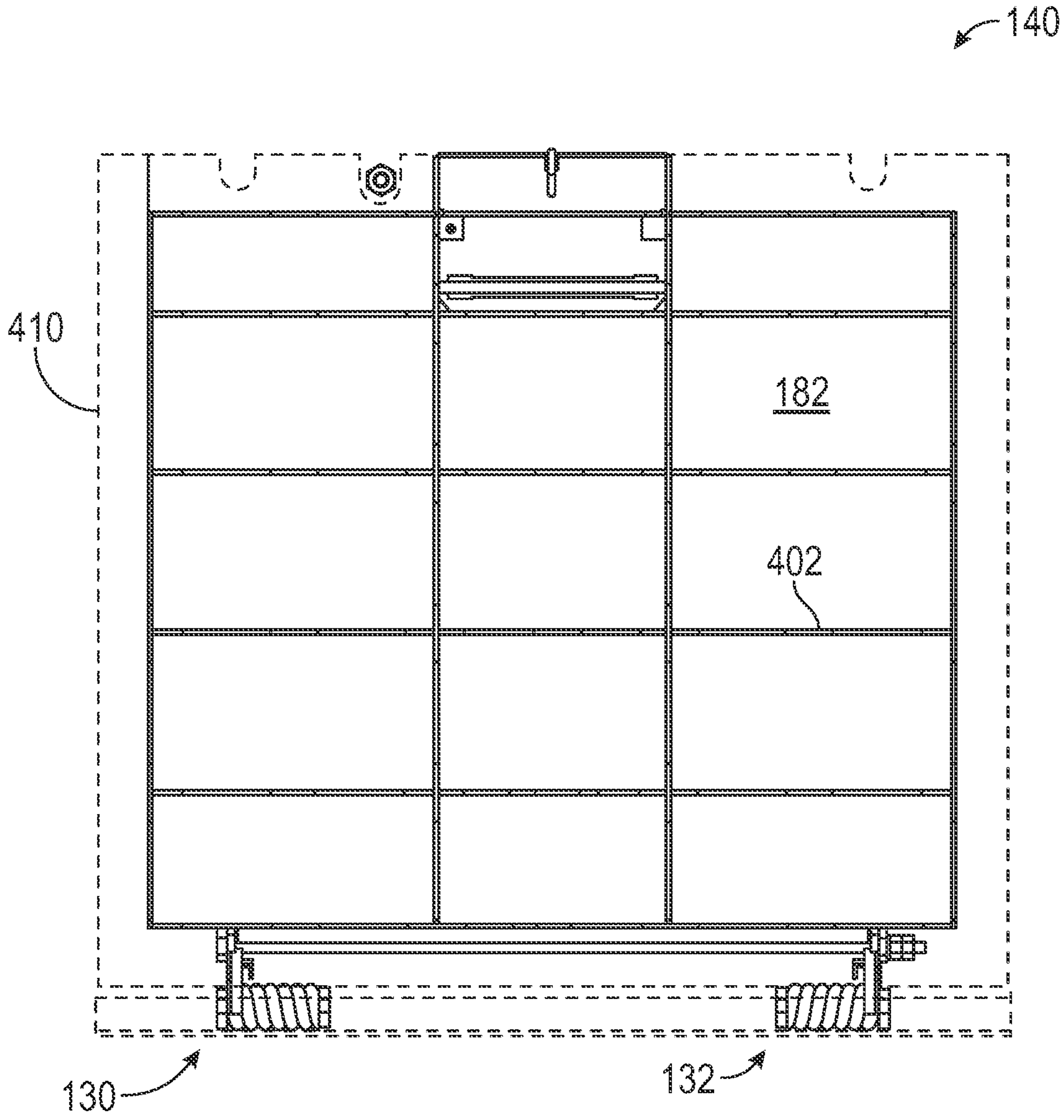
FIG. 4 depicts a top view of a support structure of the cover including first and second hinge assemblies, according to various embodiments of the present disclosure.

FIG. 4 depicts the support structure 140 of cover assembly 102 including first and second hinge assemblies, according to various embodiments of the present disclosure. Support structure 140 may be constructed from a grid comprising flatbars 402 welded together such as to form compartments 182 of a regular or unregular grid. Support structure 140 may be welded to the underside of cover 103 to provide support for cover assembly 102, e.g., to increase the weight that cover 103 can handle when exposed to foot or vehicle traffic. Alternatively, support structure 140 may be removably attached to cover 103 (denoted by a dotted line in FIG. 4), for example, using fasteners. Support structure 140 may be placed at a certain distance (e.g., two inches) from the periphery or edge 410 of cover 130.

Figure 5A:
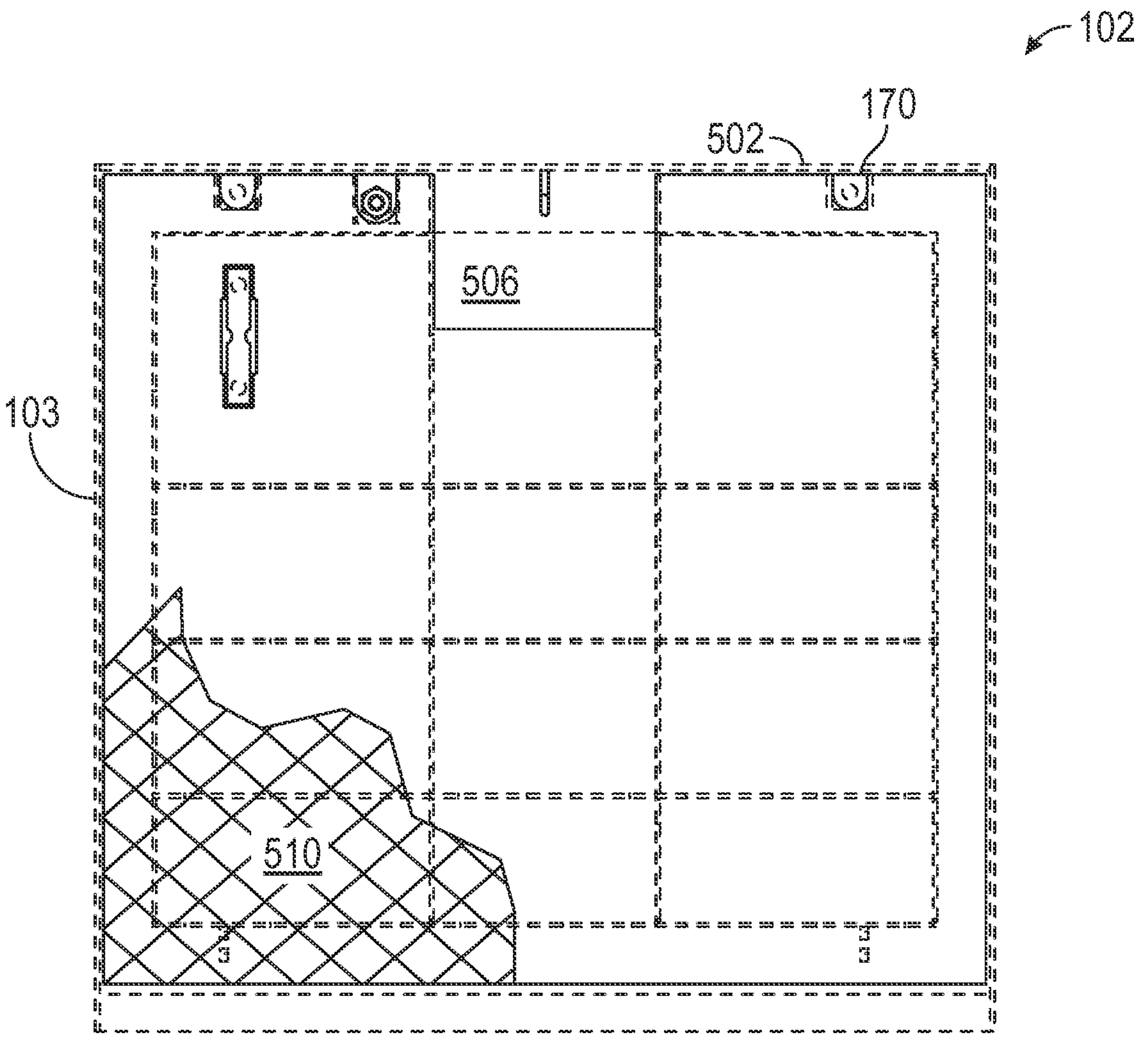
FIG. 5A is a top view of a cover assembly according to various embodiments of the disclosure.
Figure 5B:
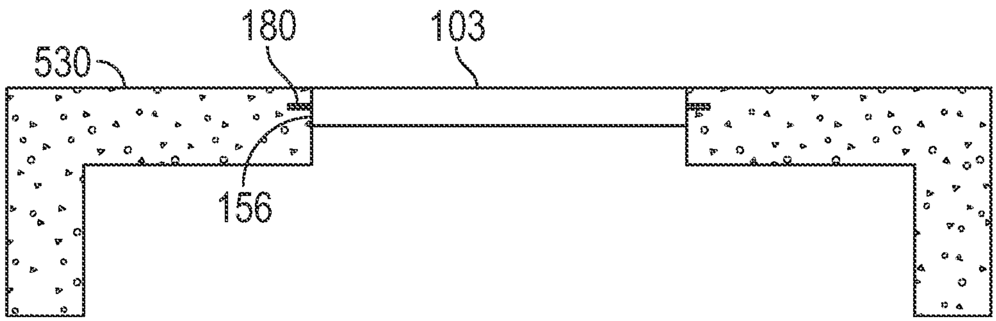
FIG. 5B is a cross-section of the hatch assembly installed in an exemplary concrete structure.

FIG. 5A is a top view of the cover assembly 102. The outward facing, i.e., exterior surface 510 of cover 103 of cover assembly 102 may be fabricated as diamond plate having anti-slip functionality, fabricated from steel or other material of similar strength, for example, to withstand traffic, prevent unauthorized access, and the like. Cover 103 may further comprise any number of cutouts 506, e.g., for accommodating lid 104 (shown in FIG. 1). As shown in FIG. 2A, lid 104 typically remains flush with cover 103 when cover 103 is closed. Edge 502 of cover 103 may comprise cutout 170 to which a recessed area may be attached, which receives a bolt that is used to secure edge 502 to, e.g., hex nut 174 located in frame 150, as shown, e.g., in FIG. 3. FIG. 5B is a cross-section of the hatch assembly installed in an exemplary structure 530, which may a concrete or asphalt-type material. As depicted, anchors 180 extend outwardly from outer surface 156 of frame 150 and anchors frame 150 in its surroundings.

Figure 5C:
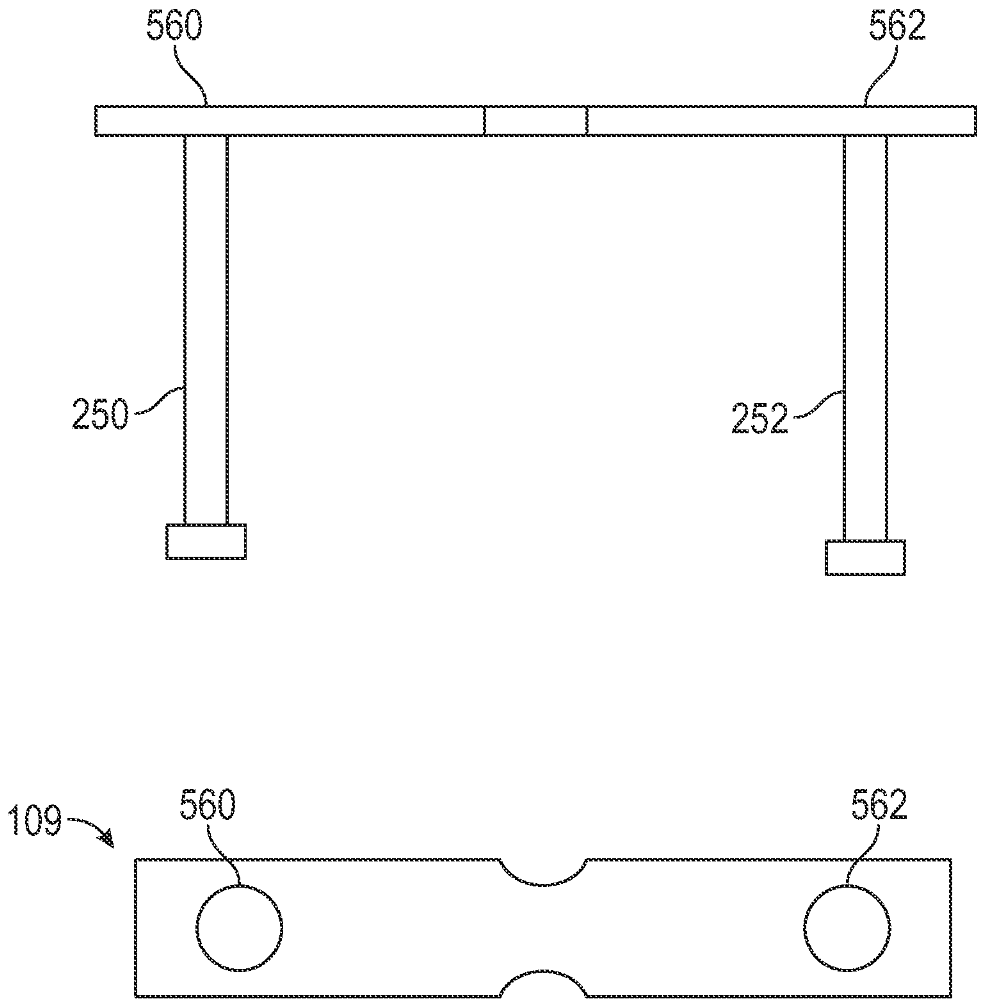
FIG. 5C depicts cross-sectional and top views of the exterior of a recessable handle according to various embodiments of the present disclosure.

FIG. 5C depicts cross-sectional and top views of the exterior of recessable handle 109 according to various embodiments of the present disclosure. Handle 109 comprises holes 560 and 562. Handle 109 connects to Nelson studs 250, 252 whose stops are dimensioned to be larger than holes 560 and 562 such as to prevent handle 109 from being completely pulled out of the cover assembly when, in operation, handle 109 is used manually to lift the cover assembly (not shown in FIG. 5C).

Figure 6A:
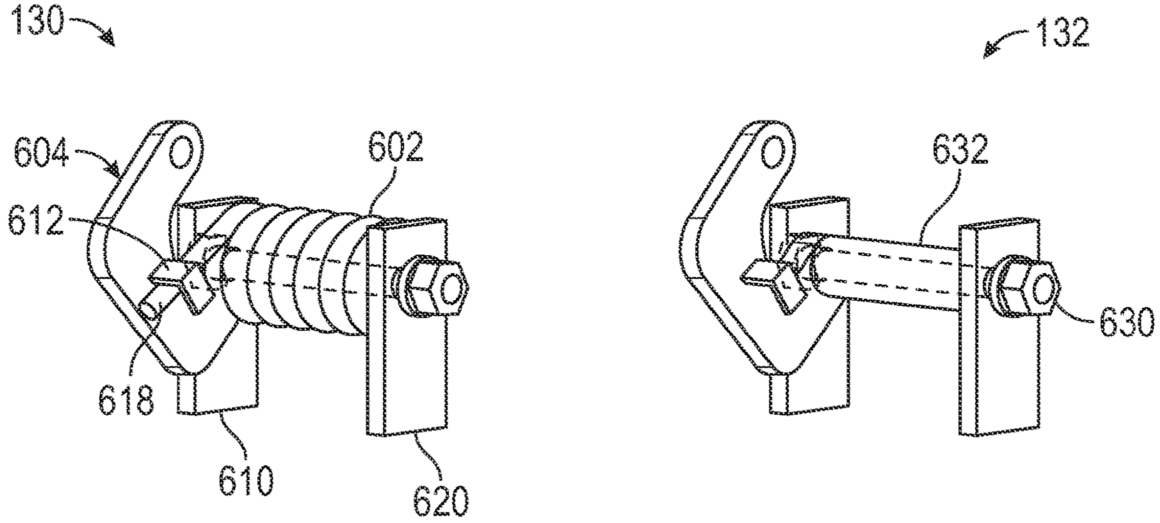
FIG. 6A depicts a perspective view of a pair of hinge assemblies according to various embodiments of the disclosure.
Figure 6B:
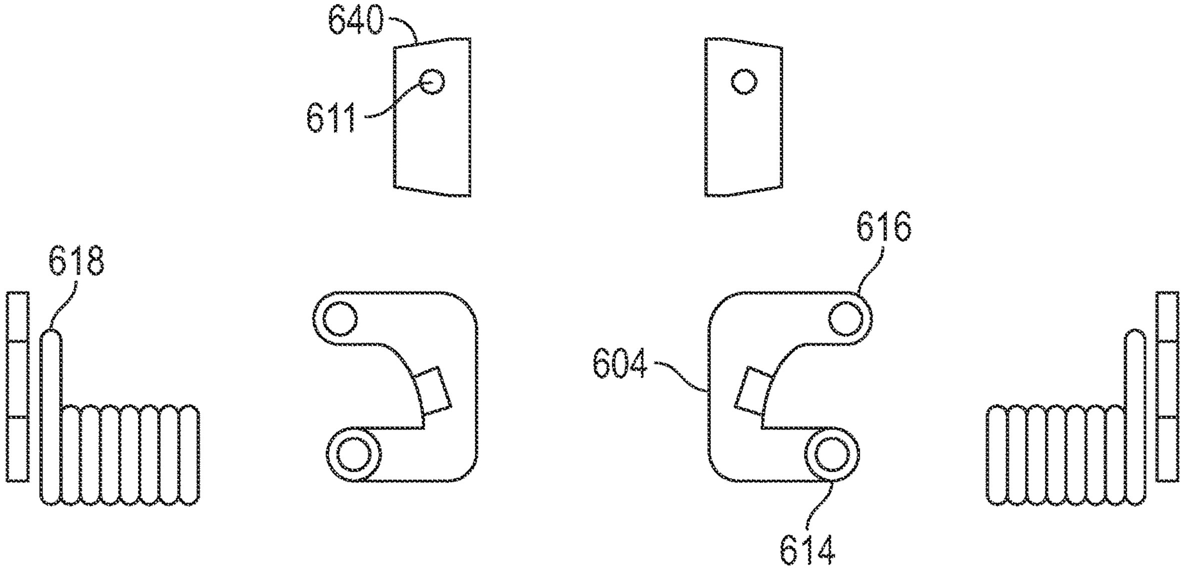
FIG. 6B depicts details of the springs and hinge brackets of the pair of hinge assemblies shown in FIG. 6A.
Figure 6C:
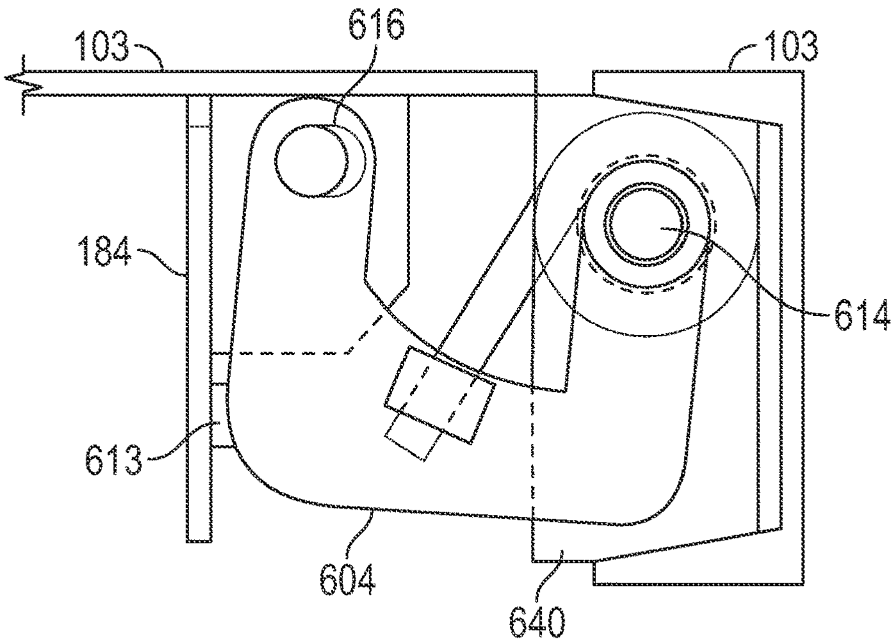
FIG. 6C is a cross-section of the hinge assembly in a resting position.
Figure 6D:
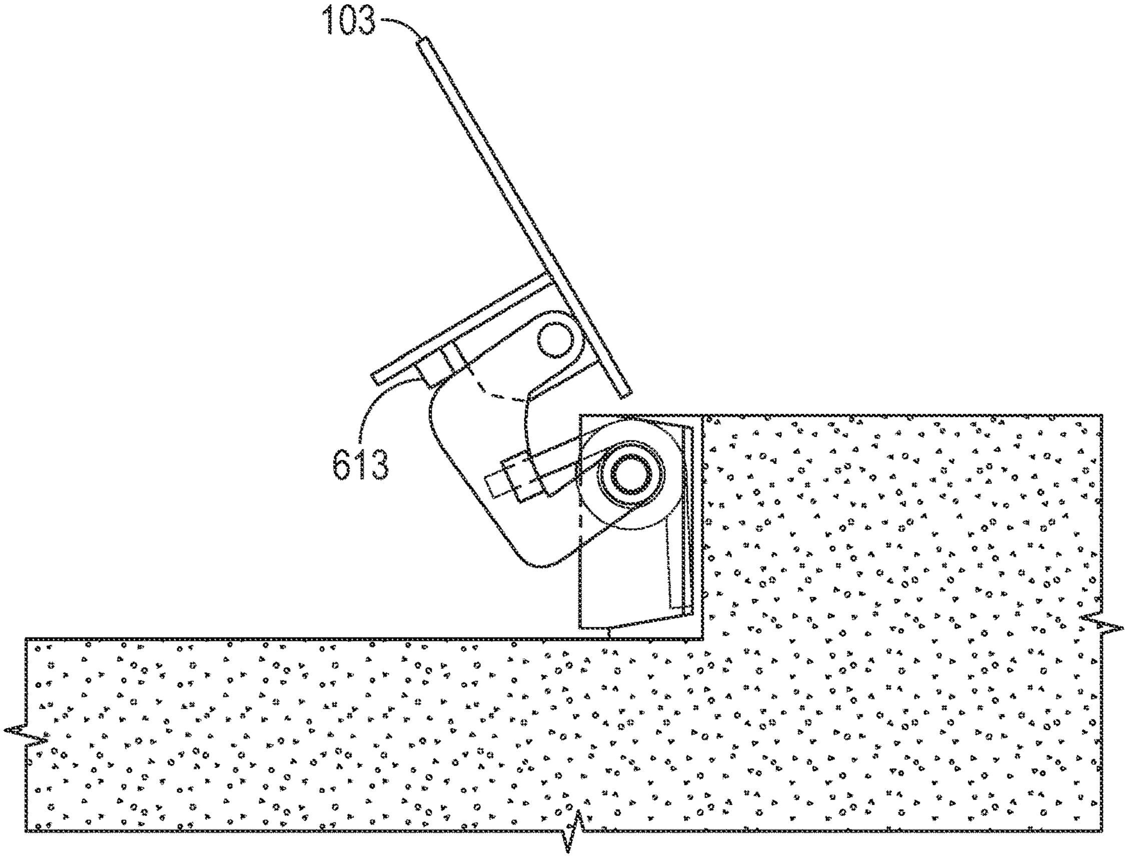
FIG. 6D is a cross-section of the hinge assembly in an open-cover position in a concrete environment.

FIG. 6A depicts a perspective view of a pair of hinge assemblies according to various embodiments of the disclosure; FIG. 6B depicts details of the springs and hinge brackets of the pair of hinge assemblies shown in FIG. 6A; FIG. 6C is a cross-section of the hinge assembly in a closed-cover or resting position; and FIG. 6D is a cross-section of the hinge assembly in an open-cover position shown in a concrete environment. Hinge assembly 130 comprises spring 602 that is removably attached to U-shaped hinge bracket 604, e.g., via a shaft or a central rod, such as carriage bolt 630 (shown in FIG. 6A) or a hinge pin. Hinge assembly 130 further comprises stationary mounting brackets 610 and 620, which receive tube 632, on carriage bolt 630, that carries spring 602. As depicted, the top and bottom ends of mounting brackets 610 and 620 may be tapered, e.g., such as to fit into C-shaped sidewall 158 of frame 150 when being welded thereto.

In operation, hinge bracket 604 connects cover assembly 102 to hinge assemblies 130, 132 and, thus, to frame 150. It is understood that spring 602 is made from a wire whose dimensions define an inner and an outer diameter of spring 602. It is further understood that the material of the wire may be any suitable rigid material to achieve a desired torque and other mechanical performance characteristics.

As shown in FIG. 6B, hinge bracket 604 may comprise, e.g., near a first end, a first hinge bore 614 for receiving carriage bolt and, near an opposing second end, a second hinge bore 616 that is an elongated hole. Plate 640, as shown in FIG. 6C and FIG. 6D, is welded to the underside of cover 103.

As shown in FIG. 6A, hinge bracket 604 may further comprise semi-open enclosure 612 extending perpendicular from a side surface that faces spring 602. In operation, when the cover is being closed, enclosure 612 acts as a lever that is designed to receive movable end 618 of spring 602 and apply sufficient torque on end 618 to compress spring 602, in response to hinge bracket 604 being moved by way of closing the cover. Semi-open enclosure 612 may advantageously be used to prevent end 618 from inadvertently escaping under torque. It is understood that for simplicity, especially if spring 602 is sufficiently rigid, semi-open enclosure 612 may be replaced by a plate that extends perpendicular from hinge bracket 604 and perform a similar function. In the closed-cover position illustrated in FIG. 6C, alignment spacer 613, which is welded to flatbar 184, pushes hinge bracket 604 such as to cause hinge bracket 604 to rotate by a certain angle. This exerts pressure to spring 602 and helps to keep the front of the cover 103 closed. Advantageously, various components of a hatch, such as spring 602, may easily be repairable and replaceable, thus significantly reducing installation, maintenance, and repair costs of hatch assemblies that utilize hinge assembly 130.

Figure 7:
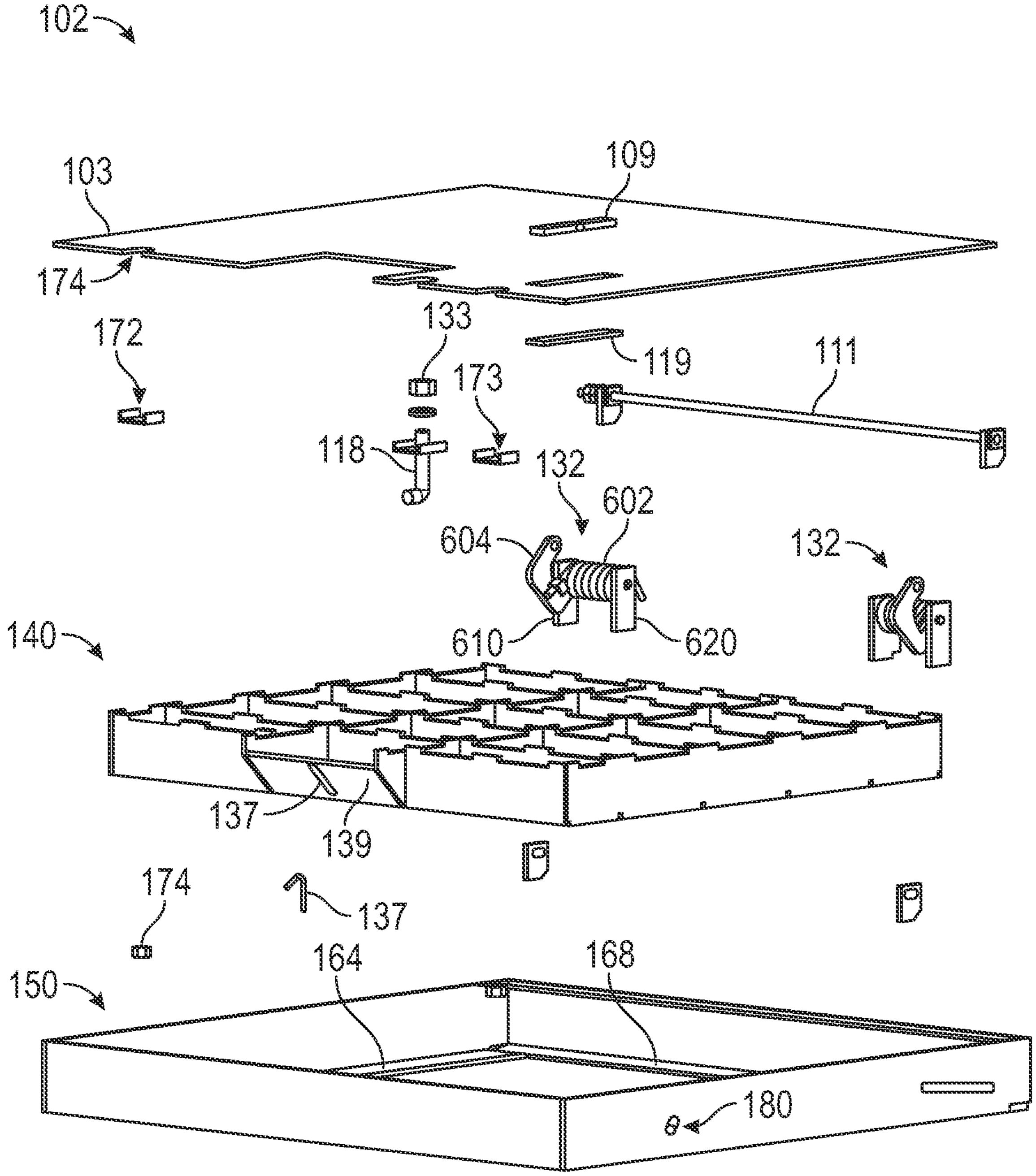
FIG. 7 is an exploded view of an embodiment of the hatch assembly shown in FIG. 1.

FIG. 7 is an exploded view of a hatch assembly shown in FIG. 1. In operation, hinge assembly 130 is used to hinge a door or access cover 102 to frame 150. In embodiments, spring 602 may comprise one end 618 that extends away from spring 602 perpendicular to the spring's central axis. In operation, end 618 is angularly deflected relative to the central axis of spring 602 in the direction of the movement of the cover.

In operation, end 618 of spring 602 experiences a rotational force that is generated by operation of hinge bracket 604 as cover 103 is being closed. The force exerted by hinge bracket 604 creates a torque in spring 202 that causes it to twist and store kinetic energy, e.g., throughout the range of motion of cover assembly 102 that operates hinge bracket 604 when a user applies a force to close cover 103. Contrariwise, once cover 103 is being opened, unwinding spring 602, the energy stored in spring 602 is converted to kinetic energy that aids the opening motion of cover 103 as spring 602 returns to its original and undeformed shape. To ensure safe and effective operation, any number of hinge assemblies 130 may be dimensioned such as to withstand the amount of torque generated by the weight of cover assembly 102, taking into account factors such as potential material fatigue and deformation.

In detail, a rotational force of hinge bracket 604 perpendicular to the direction of the axis of a carriage bolt, which serves as a pivot, point will compress spring 602, such that when cover assembly 102 is continuously lowered (e.g., from a vertical position) to assume a horizontal closing position, loaded or stressed spring 602 will provide an appropriate force that opposes the gravitational force exerted on cover assembly 102 and, thus, decelerates the movement of cover assembly 102. Stated differently, during the closing motion of cover assembly 102, depending on the angle of rotation of cover assembly 102, which translates into an angle of rotation of end 618 of spring 602, the spring 602 is under torsional stress, tending to lift cover assembly 102.

Advantageously, supporting the weight of cover assembly 102 in this manner aids in resisting a rapid and uncontrolled fall or closing of cover assembly 102, thus allowing users to almost effortlessly operate, i.e., open and close, cover 103. It is understood that the operation of hinge assembly 130 is repeated for any other hinge assembly according to the present disclosure. Overall, embodiments herein allow for the maintenance-free operation of hatches having relatively heavy-weight covers or doors that can be opened and closed without requiring users to engage in heavy lifting.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification do not necessarily all refer to the same embodiment or embodiments.

Although embodiments of the invention are described herein and in the figures, many variations of hatch and hinge assemblies are possible. Furthermore, the number of various components of each embodiment may be increased such as those used for underground utility walls, or decreased. Additionally, features of the various embodiments disclosed may be combined in various ways with one or more other features constituting an embodiment that may differ from those individually described.

The above description and the figures of the disclosed embodiments are provided to enable any person skilled in the art to make and use the invention. Various modifications to these embodiments will be readily apparent to those skilled in the art, and the generic principles described herein can be applied to other embodiments without departing from the spirit or scope of the invention. Thus, it is to be understood that the description and the figures presented herein represent example implementations of the invention and are therefore representative of the subject matter which is broadly contemplated by the present invention. It is further understood that the scope of the present invention fully encompasses other embodiments that may become obvious to those skilled in the art.

What is claimed is:

1. A hatch assembly for an inground utility enclosure, the hatch assembly comprising:

- a frame comprising two pairs of opposing sidewalls, each sidewall comprising a bottom portion, the combination of the bottom portions defining an opening in the frame;
- a cover assembly pivotally connected to the frame, the cover assembly comprising a cover having a bottom surface and flatbars that extend perpendicular to the bottom surface; and
- a hinge assembly mounted to one of the sidewalls, the hinge assembly comprising:
  - a torsion spring comprising a coiled body that is coiled along a center axis and having first and second ends, wherein the first end extends away from the coiled body;

a shaft extending through the center axis of the torsion spring; and a hinge bracket coupled to the cover assembly and including a torsion spring engagement member that faces the torsion spring, the torsion spring engagement member, in response to the hinge bracket being rotated, engages the first end of the torsion spring and causes the torsion spring to rotate, wherein at least one of the sidewalls form sides of the frame and include a front end and a rear end, and comprise, along a periphery of the frame and between the front end and the rear end, a plurality of linear anchors in the form of studs extending outwardly at a non-perpendicular angle from the frame, between the front end and the rear end.

2. The hatch assembly according to claim 1, wherein the cover has a top surface opposite the bottom surface and the top surface comprises an anti-slip surface.

3. The hatch assembly according to claim 1, further comprising a semi-open enclosure that at least partially encloses the first end of the torsion spring.

4. The hatch assembly according to claim 1, wherein the anchors are configured to anchor the frame into a concrete or asphalt surrounding.

5. The hatch assembly according to claim 2, wherein the cover comprises a first cutout with a recessed area.

6. The hatch assembly according to claim 2, wherein the cover comprises a first cutout for accommodating a lid.

7. The hatch assembly according to claim 6, wherein a resting position of the lid is flush with the cover.

8. The hatch assembly according to claim 1, further comprising an alignment spacer disposed between and in contact with one of the flatbars and the hinge bracket.

9. The hatch assembly according to claim 1, wherein the hinge bracket includes a hinge bore that is an elongated hole for coupling the hinge bracket to the cover assembly.

10. A hatch assembly for an inground utility enclosure, the hatch assembly comprising:

a frame comprising two pairs of opposing sidewalls, each sidewall comprising a bottom portion, the combination of the bottom portions defining an opening in the frame:

a cover assembly pivotally connected to the frame, the cover assembly comprising a cover having a bottom surface and flatbars that extend perpendicular to the bottom surface; and a hinge assembly mounted to one of the sidewalls, the hinge assembly comprising:

a torsion spring comprising a coiled body that is coiled along a center axis and having first and second ends, wherein the first end extends away from the coiled body:

a shaft extending through the center axis of the torsion spring; and a hinge bracket coupled to the cover assembly and including a torsion spring engagement member that faces the torsion spring, the torsion spring engagement member, in response to the hinge bracket being rotated, engages the first end of the torsion spring and causes the torsion spring to rotate, wherein an alignment spacer is disposed between and in contact with one of the flatbars and the hinge bracket.

11. The hatch assembly according to claim 10, wherein at least one of the sidewalls comprise, along a periphery of the frame, a plurality of linear anchors in the form of studs extending outwardly at a non-perpendicular angle from the frame.

12. The hatch assembly according to claim 10, wherein the hinge bracket includes a hinge bore that is an elongated hole for coupling the hinge bracket to the cover assembly.

* * * * *